(12) United States Patent
Cazalet

(10) Patent No.: US 9,128,284 B2
(45) Date of Patent: Sep. 8, 2015

(54) DEVICE MOUNTABLE LENS COMPONENT

(71) Applicant: Google Inc., Mountain View, CA (US)

(72) Inventor: Peter Michael Cazalet, Campbell, CA (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 13/769,600

(22) Filed: Feb. 18, 2013

(65) Prior Publication Data

US 2014/0233108 A1   Aug. 21, 2014

(51) Int. Cl.
*G02B 27/14* (2006.01)
*G02B 27/01* (2006.01)

(52) U.S. Cl.
CPC ........ *G02B 27/0172* (2013.01); *G02B 27/0176* (2013.01); *G02B 2027/0178* (2013.01)

(58) Field of Classification Search
CPC ................................ G02B 27/017; G02B 7/02
USPC .......... 359/630; 351/103, 106, 47–49, 52, 55, 351/57–59, 69, 71, 80, 95, 130; 345/8
See application file for complete search history.

(56) References Cited

U.S. PATENT DOCUMENTS

| | | | |
|---|---|---|---|
| 1,025,124 A | 5/1912 | Corbett | |
| D80,311 S | 1/1930 | Helm | |
| D136,048 S | 7/1943 | Schmid | |
| 2,337,617 A | 12/1943 | Miller, Jr. | |
| D167,526 S | 8/1952 | Murphy | |
| D215,032 S | 8/1969 | Huggins | |
| D219,755 S | 1/1971 | Bloch | |
| 3,600,069 A | 8/1971 | McNeill | |
| 3,701,591 A | 10/1972 | Wichers | |
| 3,944,344 A | 3/1976 | Wichers | |
| 4,240,718 A | 12/1980 | Wichers | |
| D267,724 S | 1/1983 | Staller | |
| 4,400,067 A | 8/1983 | Joffe | |
| D274,181 S | 6/1984 | Abate et al. | |
| D280,994 S | 10/1985 | Abate | |
| 4,867,551 A | 9/1989 | Perera | |

(Continued)

FOREIGN PATENT DOCUMENTS

WO    20100092904 A1    8/2010

OTHER PUBLICATIONS

International Search Report and Written Opinion for Application No. PCT/US2013/029019 dated Jun. 3, 2013.

(Continued)

*Primary Examiner* — Scott J Sugarman
*Assistant Examiner* — Vipin Patel
(74) *Attorney, Agent, or Firm* — Lerner, David, Littenberg, Krumholz & Mentlik, LLP

(57) ABSTRACT

An aspect of the present disclosure relates to a device mountable lens component, including a lens unit defining a first surface and having a first lens. The component also includes a retention structure having a housing member defining a second surface. The housing member is attached with the lens unit such that the second surface faces the first surface and is spaced apart therefrom at a first distance so as to define an area therebetween. The retention structure also has first and second plungers movably affixed within the area between the lens unit and the housing member. The first and second plungers are biased away from each other in opposite directions along a path and are moveable toward and away from each other along the path.

30 Claims, 13 Drawing Sheets

(56) References Cited

U.S. PATENT DOCUMENTS

| | | |
|---|---|---|
| 4,998,815 A | 3/1991 | Lin |
| D327,079 S | 6/1992 | Allen |
| D334,557 S | 4/1993 | Hunter et al. |
| D337,320 S | 7/1993 | Hunter et al. |
| D346,813 S | 5/1994 | McAlpin |
| D354,969 S | 1/1995 | Garcia |
| D354,974 S | 1/1995 | Wielhouwer |
| D356,286 S | 3/1995 | Shink |
| 5,469,229 A | 11/1995 | Greenbaum |
| D366,888 S | 2/1996 | Locquiao |
| 5,533,207 A | 7/1996 | Diaz |
| 5,539,422 A | 7/1996 | Heacock et al. |
| D375,111 S | 10/1996 | Wielhouwer |
| 5,729,321 A | 3/1998 | Wielhouwer |
| D402,651 S | 12/1998 | Depay et al. |
| 5,953,096 A | 9/1999 | Friedman |
| 5,975,692 A * | 11/1999 | Pedron et al. .................... 351/47 |
| 6,023,372 A | 2/2000 | Spitzer et al. |
| 6,034,653 A | 3/2000 | Robertson et al. |
| D428,620 S | 7/2000 | Maturaporn |
| D429,253 S | 8/2000 | Robertson et al. |
| D431,042 S | 9/2000 | Lin |
| D436,960 S | 1/2001 | Budd et al. |
| 6,325,506 B1 * | 12/2001 | Cooper ............................ 351/47 |
| D461,486 S | 8/2002 | Katagiri et al. |
| 6,747,611 B1 | 6/2004 | Budd et al. |
| 6,779,886 B2 * | 8/2004 | Huang ............................ 351/47 |
| 6,945,648 B2 | 9/2005 | Schindler et al. |
| D512,985 S | 12/2005 | Travers et al. |
| D521,493 S | 5/2006 | Wai |
| D523,461 S | 6/2006 | Jannard et al. |
| D533,893 S | 12/2006 | Canavan et al. |
| 7,158,096 B1 | 1/2007 | Spitzer |
| D537,078 S | 2/2007 | Tanaka et al. |
| 7,219,993 B1 | 5/2007 | Chiou |
| 7,284,853 B2 | 10/2007 | Friedman |
| D559,250 S | 1/2008 | Pombo et al. |
| 7,322,691 B2 * | 1/2008 | Xie ................................. 351/57 |
| D565,082 S | 3/2008 | McClure et al. |
| D566,744 S | 4/2008 | Travers et al. |
| 7,360,889 B2 | 4/2008 | Yong |
| D571,838 S | 6/2008 | Yee |
| D578,120 S | 10/2008 | Lowe et al. |
| 7,470,022 B2 | 12/2008 | Lerner |
| 7,475,981 B2 | 1/2009 | Yong |
| 7,517,082 B2 | 4/2009 | Huang |
| D593,146 S | 5/2009 | Powless |
| D602,064 S | 10/2009 | Mitsui et al. |
| 7,600,871 B2 | 10/2009 | Lane et al. |
| 7,631,968 B1 | 12/2009 | Dobson et al. |
| 7,648,236 B1 | 1/2010 | Dobson |
| 7,663,805 B2 | 2/2010 | Zaloum et al. |
| 7,675,683 B2 | 3/2010 | Dobson et al. |
| D616,486 S | 5/2010 | Carlow et al. |
| 7,753,520 B2 | 7/2010 | Fuziak, Jr. |
| 7,782,589 B2 | 8/2010 | Menduni et al. |
| 7,792,763 B2 | 9/2010 | Embree |
| 7,843,403 B2 | 11/2010 | Spitzer |
| D636,809 S | 4/2011 | Hwang et al. |
| D639,332 S | 6/2011 | Basler et al. |
| 8,000,000 B2 | 8/2011 | Greenberg et al. |
| D645,492 S | 9/2011 | Zhao |
| D646,316 S | 10/2011 | Zhao |
| D647,123 S | 10/2011 | Cho |
| 8,029,132 B1 | 10/2011 | Park |
| D649,177 S | 11/2011 | Cho et al. |
| D658,812 S | 5/2012 | Miller, IV et al. |
| D659,137 S | 5/2012 | Matsumoto |
| D659,739 S | 5/2012 | Olsson et al. |
| D659,740 S | 5/2012 | Olsson et al. |
| D659,741 S | 5/2012 | Heinrich et al. |
| D660,341 S | 5/2012 | Olsson et al. |
| D662,964 S | 7/2012 | Olsson et al. |
| D662,966 S | 7/2012 | Jeon |
| D664,184 S | 7/2012 | Olsson et al. |
| D664,185 S | 7/2012 | Heinrich et al. |
| D664,586 S | 7/2012 | Olsson |
| D666,237 S | 8/2012 | Olsson et al. |
| D667,482 S | 9/2012 | Healy et al. |
| D669,066 S | 10/2012 | Olsson et al. |
| D671,589 S | 11/2012 | Olsson |
| D671,590 S | 11/2012 | Klinar et al. |
| D680,152 S | 4/2013 | Olsson et al. |
| D684,321 S | 6/2013 | Gill |
| D687,087 S | 7/2013 | Iurilli |
| D687,828 S | 8/2013 | Sato et al. |
| D688,294 S | 8/2013 | Roy et al. |
| D688,727 S | 8/2013 | Olsson |
| 8,542,326 B2 | 9/2013 | MacNaughton et al. |
| D691,602 S | 10/2013 | Sugihara et al. |
| D692,424 S | 10/2013 | Pombo et al. |
| D694,311 S | 11/2013 | Cho et al. |
| D696,712 S | 12/2013 | Armstrong et al. |
| D697,962 S | 1/2014 | Olsson |
| D698,383 S | 1/2014 | Hong |
| 8,622,542 B2 * | 1/2014 | Takahashi .................... 351/158 |
| D701,506 S | 3/2014 | Pombo |
| D703,724 S | 4/2014 | Olsson |
| D704,705 S | 5/2014 | Mehin et al. |
| D706,859 S | 6/2014 | Markovitz et al. |
| D708,181 S | 7/2014 | Olsson et al. |
| D709,122 S | 7/2014 | Markovitz et al. |
| D709,943 S | 7/2014 | Du |
| D710,928 S | 8/2014 | Heinrich et al. |
| D711,373 S | 8/2014 | Lee et al. |
| D711,375 S | 8/2014 | Lee et al. |
| D711,376 S | 8/2014 | Lee et al. |
| D715,295 S | 10/2014 | Lee et al. |
| D716,299 S | 10/2014 | Olsson et al. |
| 2001/0055093 A1 | 12/2001 | Saitoh et al. |
| 2002/0021407 A1 | 2/2002 | Elliott |
| 2004/0027533 A1 * | 2/2004 | Xie ................................. 351/41 |
| 2005/0219152 A1 | 10/2005 | Budd et al. |
| 2005/0237271 A1 | 10/2005 | Yamamoto |
| 2006/0158608 A1 | 7/2006 | Lin |
| 2007/0046891 A1 | 3/2007 | Niu |
| 2007/0052672 A1 | 3/2007 | Ritter et al. |
| 2008/0143951 A1 | 6/2008 | Won |
| 2008/0169998 A1 | 7/2008 | Jacobsen et al. |
| 2008/0198324 A1 | 8/2008 | Fuziak |
| 2009/0066863 A1 | 3/2009 | Chen |
| 2009/0201460 A1 | 8/2009 | Blum et al. |
| 2010/0045928 A1 | 2/2010 | Levy |
| 2010/0073262 A1 | 3/2010 | Matsumoto |
| 2010/0110368 A1 | 5/2010 | Chaum |
| 2010/0149073 A1 | 6/2010 | Chaum et al. |
| 2010/0157433 A1 | 6/2010 | Mukawa et al. |
| 2010/0188314 A1 | 7/2010 | Miyake et al. |
| 2011/0012814 A1 | 1/2011 | Tanaka |
| 2011/0213664 A1 | 9/2011 | Osterhout et al. |
| 2012/0218507 A1 | 8/2012 | Calilung et al. |
| 2013/0044042 A1 | 2/2013 | Olsson et al. |
| 2013/0188080 A1 | 7/2013 | Olsson et al. |

OTHER PUBLICATIONS

International Search Report for Application No. PCT/US2014/016030 dated May 27, 2014.

\* cited by examiner

DEVICE MOUNTABLE LENS COMPONENT

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays", "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible. Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Additionally, some displays may not be easily configured for persons with ocular diseases or disorders, such as those persons who require corrective lenses or who otherwise desire to use such displays in conjunction with lenses configured to provide protection, either in the form of physical or UV protection. In these instances, some displays may not cooperate with such corrective or protective lenses, thereby causing a person to wear the display without the benefits associated therewith. In this scenario, the person may have difficulty resolving the images being presented by the displays or may otherwise be vulnerable to injury or damage from UV exposure.

BRIEF SUMMARY

An aspect of the present disclosure relates to a device mountable lens component, including a lens unit defining a first surface and having a first lens. The component also includes a retention structure having a housing member defining a second surface. The housing member is attached with the lens unit such that the second surface faces the first surface and is spaced apart therefrom at a first distance so as to define an area therebetween. The retention structure also has first and second plungers movably affixed within the area between the lens unit and the housing member. The first and second plungers are biased away from each other in opposite directions along a path and are moveable toward and away from each other along the path.

The housing member can include a pair of spaced-apart bosses extending away from the second surface to contact the first surface of the lens unit. In such an example, the housing member can be affixed to the lens unit at the bosses, and the plungers can each include respective slots therethrough that extend along the direction of the path and are configured to receive a respective one of the bosses therethrough. Further, the housing member can include a flange projecting away from the second surface toward the first surface. The flange can extend along the second surface in a direction generally parallel with the path such that the plungers are configured to contact the flange through any movement thereof along the path.

In an example, the plungers can each include first and second faces on opposite sides thereof, and the first and second faces can respectively contact the first surface of the lens unit and the second surface of the housing member. In a further example, the first surface of the lens unit and the second surface of the housing member can define a curvature in at least one direction, and the first and second faces of the plungers can define curvatures to respectively match those of the first and second surfaces. In such an example, the path can be curved along a plane generally perpendicular to the housing member.

The plungers can be biased away from each other by a first spring positioned therebetween. In a particular example, the housing member can include a flange extending away from the second surface thereof toward the first surface of the lens unit, and the plungers can be positioned on opposite sides of the flange. The plungers can be biased away from each other by the first spring positioned between a first one of the plungers and the flange and a second spring positioned between a second one of the plungers and the flange.

The plungers can each include an outside end, each of the outside ends including a curved face. In one example, the curved faces can be semi-circular.

The plungers can be integral with a biasing element extending therebetween. In a particular example, the first and second plungers can be integral portions of a biasing member affixed within the area between the first lens unit and the housing member. The biasing member can include a spring portion between the plungers that biases the plungers away from each other.

The first lens of the lens unit can be configured to be simultaneously positionable over both eyes of a wearer and can define a central attachment area to which the retention structure is attached. In such an example, the first surface can extend at least within the attachment area. In another example, the lens unit can further include a second lens and a bridge member attached between the first lens and the second lens. In this example, the retention structure can be attached to the bridge member and the first surface can be defined on the bridge member.

Another aspect of the present disclosure relates to a head-wearable device system. The system includes a head retention structure having a center frame support, a first side arm extending from the center frame support on a first side thereof, and a second side arm extending from the center frame support on a second side thereof. The head retention structure further includes a nosepiece defined by a pair of nosepiece arms extending from a surface the center frame support between the first and second sides. The system also includes a lens unit defining a lens unit surface and including a lens and first, second, and third attachment surfaces extending away from the lens unit surface. The first and second attachment surfaces face away from each other, and the third attachment surface extends between the first and second attachment surfaces. The lens unit is removably attachable with the head retention structure by engagement of the first second attachment surfaces with respective ones of the nosepiece arms and by engagement of the third attachment surface with the surface of the center frame support. The engagement of the first and second attachment surfaces with the respective nosepiece arms creates an engagement force therebetween with a first directional component parallel to the center frame support and with a second directional component that maintains the third attachment surface in engagement with the surface of the center frame support.

The lens unit can further include first and second plungers movably affixed with the lens unit. In such an example, the first and second plungers can be biased away from each other in opposite directions along a path and moveable toward and away from each other along the path. Further, the first and second attachment surfaces can be defined on respective ones of the first and second plungers, and the first and second plungers can be configured to exert the engagement force against the nosepiece arms.

The lens unit can further include a flange projecting away from the lens unit surface. The flange can extend along the lens unit surface in a direction generally parallel with the path such that the plungers contact the flange through any movement thereof along the path. Additionally, the third attachment surface can be defined on the path.

In an example, the nose bridge arms can be spaced apart from each other at respective attachment points with the center frame support and can be shaped to extend toward each other within an upper portion of the nosepiece. In such an example, the lens unit can be removably attachable with the head retention structure by engagement of the plungers with respective nosepiece arms within the upper portion of the nosepiece. In a particular example, when the nosepiece is attached with the head retention structure, the outward force of the plungers against the nosepiece arms within the upper portion can cause a component force to be applied by the plungers against the center frame support.

The lens unit can be removable from the head retention structure by a force applied to the lens with at least a component in a direction perpendicular with the center frame support, and such a force can cause inward movement of at least one plunger against the outward force. In particular, the force applied to the lens can cause a twisting movement of the lens unit and can further cause rotational movement of one of the plungers away from the center frame support. During the twisting movement of the lens, another one of the plungers can remain in contact with both the center frame support and the respective one of the nosepiece arms. The nosepiece arms can be curved in shape so as to extend toward each other within an upper portion of the nosepiece and away from each other within a lower portion of the nosepiece with apexes of the nosepieces separating the upper and lower portions. In such an example, the inward movement of at least one of the plungers against the outward force can occur when the plunger is in the upper portion. At least one of the plungers can moves outward when the plunger is in the lower portion.

The plungers can be spring biased away from each other so as to exert the outward forces against the nosepiece arms.

The first, second, and third attachment surfaces can be defined on a unitary body that extends away from the lens and is attached thereto. In one example, the lens unit can further include a housing member defining a housing surface. The housing member can be attached with the lens such that the second surface faces the first surface and is spaced apart therefrom at a first distance so as to define an area therebetween. In such an example, the first, second, and third attachment surfaces can be disposed within the area between the lens unit surface and the housing surface.

The head retention structure can further include a display attached to the first side arm, and the lens unit is configured such that the lens is positionable between an eye of a user and the display when the head retention structure is worn by a user. The display can be affixed to the first side arm by a component housing extending from the first side arm, and the lens can further include a cutout portion configured to at least partially surround the component housing when the lens unit is attached to the head retention structure.

Another aspect of the present disclosure relates to a retention structure useable with a lens unit for attachment thereof to a head wearable unit. The retention structure includes a housing member defining a surface and including a pair of spaced-apart bosses extending away from the surface and configured for attachment with the lens such that the surface is spaced apart from the lens. The retention structure also includes first and second plungers, each including respective slots therethrough within which respective ones of the bosses are received. The plungers are movable with respect to the housing member and toward and away from each other along a path having a component in a direction of the slots. Biasing means are configured to bias the first and second plungers away from each other in opposite directions along the path.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

According to aspects of the disclosure, a lens system may include lenses and a retention structure. The lenses may be removably secured to a lens mounting surface of the retention structure by one or more fixation elements. The retention structure may also include a channel to receive a headband portion of a head wearable device.

Figure 1:
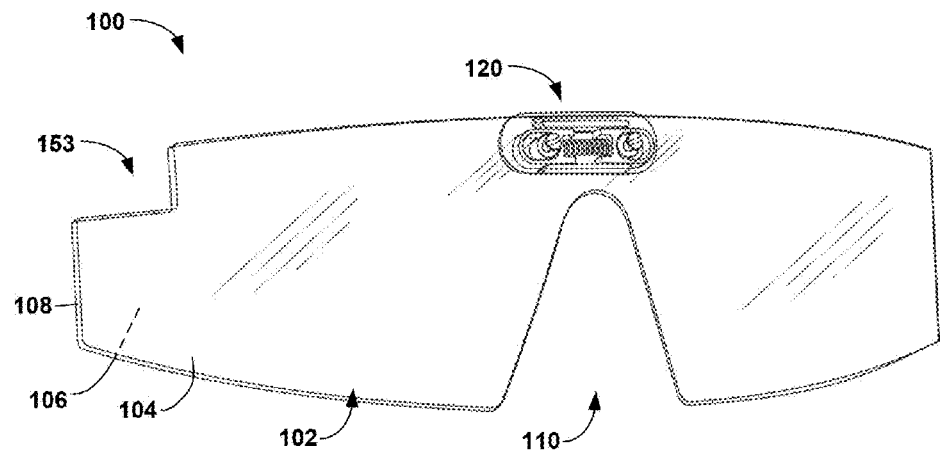
FIG. 1 illustrates a lens system according to an aspect of the disclosure.

FIG. 1 illustrates a front perspective view of a lens system 100 according to one aspect of the disclosure. The lens system 100 may include lens unit 102. The lens unit 102 may be formed as a unitary lens or may be formed as a pair of lenses attached to one another. The lens unit 102 may have two lens surfaces 104 and 106. In one example, lens surface 104 may be a front lens surface and lens unit surface 106 may be a rear lens surface. In this example, the rear lens surface may face the eye of a user when worn by the user, while the front lens surface may oppose the rear lens surface. The lens unit 102 may also have an edge surface 108 that defines a perimeter and an overall shape of the lens unit 102. In one example, the edge surface 108 may have a coating layer formed thereon, which can include, for example a polymeric material.

The perimeter of the lens unit 102 may define a nose region 110 and one or more cutout regions 153. The nose region 110 may be a space defined by the perimeter of the lens unit 102 to receive the nose of a user when worn by a user. The cutout regions 112 may be a space defined by the perimeter of the lens unit 102 to accommodate an extension arm for a display element, which will be explained in greater detail below. The lens unit 102 may be polarized or tinted to provide a user with protection from excess sunlight, UV rays, and the like. The lens unit 102 may also be configured to account for one or more ocular disorders, such as nearsightedness, farsightedness, etc.

Figure 2:
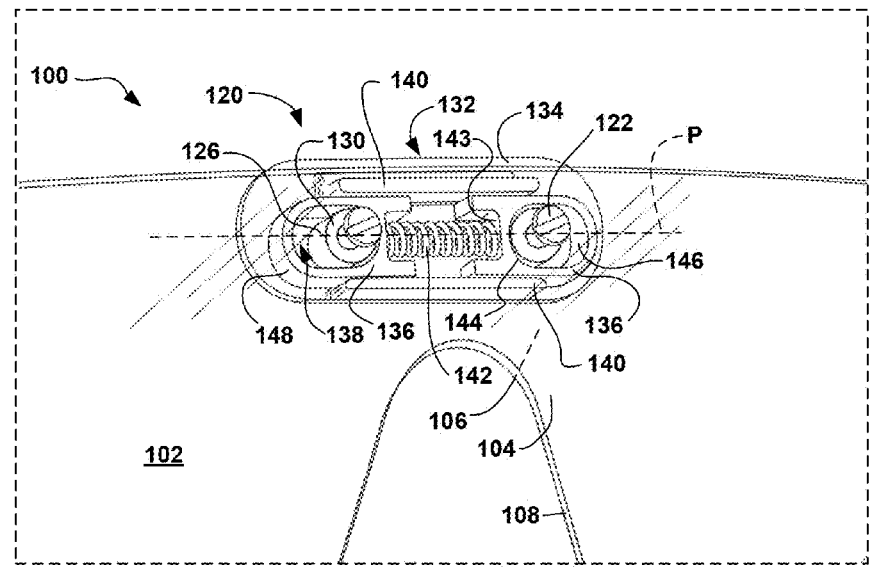
FIG. 2 is a detailed view of a portion of the lens system of FIG. 1.

FIGS. 1 and 2 illustrate that the lens system 100 may also include a retention structure 120 removably coupled to the lens unit 102 by one or more fixation elements 122. The lens unit 102 may have one or more apertures (not shown), which may align with corresponding apertures (not shown) in the retention structure 120, formed therethrough to receive the fixation elements 122. The retention structure 120 may allow the lens system 100 to be coupled to a head-wearable device, as will be explained in greater detail below.

As shown in FIG. 1, lens unit 102 can be a unitary lens structure, i.e. a "shield" style lens unit, configured to extend over both eyes of the user and to continuously define the outside 104 and inside 106 surfaces. In other examples, lens unit 102 can include separate lenses configured each to be positioned over respective eyes of the user with a bridge member extending between and connecting the lenses. In such a configuration, the inside surface 106, to which retention member 120 connects, can be defined on the bridge or on portions of the lenses that extend behind the bridge, for example. Similarly the apertures through which fixation elements 122 extend can be positioned in a bridge member or within extensions of the lenses themselves.

As shown in detail in FIG. 2, retention structure 120 may include a pair of spaced apart, generally cylindrical bosses 126, each including a respective lens mounting surface 130 that is configured to contact lens unit 102 when fixation elements 122 are received within corresponding holes (not shown) in bosses 126 for attachment of lens unit 102 to retention structure 120. Bosses 126 are mounted to and extend from a housing member 132 that extends outwardly and generally perpendicularly therefrom so as to define a housing surface 134 that is generally parallel to lens mounting surfaces 130, at least within the areas surrounding bosses 126. When retention structure 120 is affixed to lens unit 102, housing surface 134 is positioned so as to be spaced apart from the inside surface 106 of lens unit 102 at equal distances throughout the area of housing surface 134. In this manner, a volume is defined between lens unit surface 106 and housing surface 134 that has a depth defined by the distance by which the bosses 126 project from the housing member 132. Bosses 120 can be integrally formed with housing member 132 such as by being molded with housing member 132 from a single piece of material, such as thermoformable plastic material or the like.

Plungers 136 are slidably mounted within retention structure 120. As shown in FIG. 2, plungers 136 can include respective slots 138 therethrough that are sized and positioned such that bosses 126 can be received therethrough. In such a configuration, plungers 136 can be attached with retention structure 120 and, further, with lens system 100 by positioning plungers with respect to housing member 132 such that bosses 126 pass therethrough and by attachment of lens unit 120 with retention structure 120. Slots 138 can further be configured to at least partially restrict movement of plungers 136 to movement along a predetermined path P toward and away from each other. As such, slots 138 can be configured to extend in one direction to a length that is greater than the diameter of bosses 126, while being dimensioned in another direction to provide adequate clearance for boss 126 but to largely restrict movement in a direction perpendicular to the length of slots 138.

Retention structure 102 can further include one or more alignment flanges 140 extending from housing surface 134 in the same direction as bosses 126. Alignment flanges 140 can be integrally formed with housing member 132 or can be separate features attached therewith. Further, alignment flanges 140 can be positioned and configured to extend in a direction parallel with path P such that plungers 136 are maintained in respective positions or orientations such that slots 138 extend generally in the direction of path P. By this configuration, plungers 136 can be further restricted to movement toward and away from each other along path P. In the example shown in FIGS. 1 and 2, alignment flanges 140 are positioned on opposite sides of plungers 136 and are spaced apart at a distance to receive plungers 136 therebetween. In other examples, a single alignment flange 140 can be included in retention structure 120 with plungers being configured to extend therealong at a distance sufficient to maintain the desired orientation thereof. In the example of FIG. 2, the incorporation of two alignment flanges 140 into retention structure 120 can enclose, along with lens unit 102 and housing member 132, portions of plungers 136 and other features of retention structure 120 that will be discussed in greater detail below.

Figure 12:
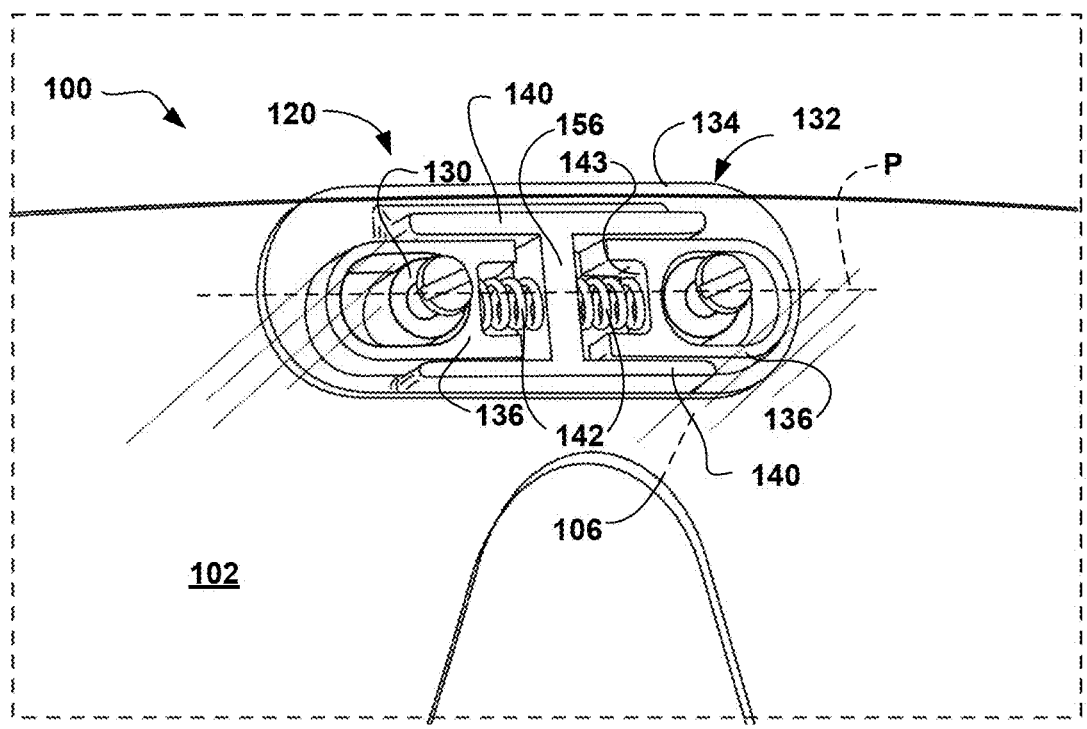
FIG. 12 is a detailed view of a portion of a lens system according to another aspect of the disclosure.
Figure 14:
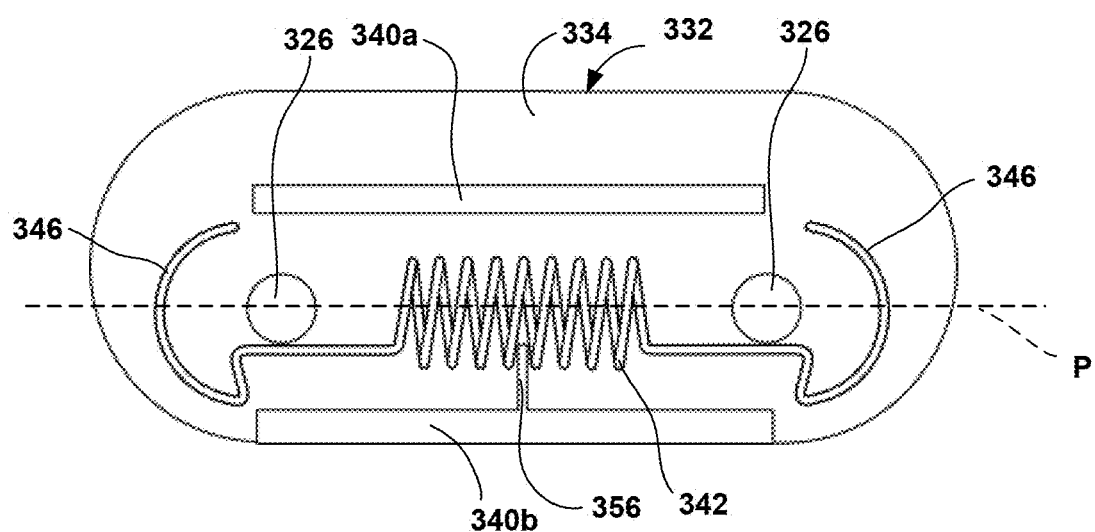
FIG. 14 illustrates a plan view of a portion of a lens system according to another aspect of the disclosure.

Plungers 136 can be biased away from each other such as by the use of one or more springs 142 positioned therebetween. In the example of FIGS. 1 and 2, a spring 142 is positioned between plungers 136 so as to contact inside surfaces 143 of plungers 136, which are positioned so that surfaces 143 face each other. Spring 142 can be positioned as such in a compressed state so that plungers 136 are urged apart from each other in a natural or rest state thereof and further when in an a configuration in which lens system 100 is unassembled with another structure. In such a configuration, the inside ends 146 of slots 138 can limit the outward movement of plungers 136 and plungers can move, upon application of a force thereto, independently inward along path P toward one another until outside ends 146 of slots 138 contact bosses 126. In another example of lens system 100, shown in FIG. 12, a pair of springs 142 can be positioned between plungers 136. In such an example, a wall 156 can extend inward from housing member 132 in a direction between and generally perpendicular to alignment flanges 140. Such a wall 156 can be positioned equidistant between plungers 136 such that each spring can be respectively positioned between one of the plungers 136 and the wall 156 to individually bias the plungers 136 outward from each other. In yet another example shown in FIG. 14, the biasing element 342 can be integrally formed with plungers 346 to as to extend therebetween in a single unit. The single unit including biasing element 342 and plungers 346 can be affixed between the lens 102 and the housing 332 by a press fit of biasing member 342 on a partial wall 356 that extends from wall 340b, for example. Other arrangements are possible, including the incorporation of loops within the structure that surround bosses 326 or the like.

Plungers 136 further define respective outside surfaces 148 that are positioned on plungers 136 to face outwardly away from one another in the assembled lens system 100. As shown, plungers 136 can have a rounded surface, such as a curved or semi-circular surface. Such a shape can facilitate attachment with other structures, as will be described below. Outside surfaces can be configured in other shapes as well, such as to define one or more flat areas between radiused corners, or alternating concave and convex areas.

The retention structure 120 may include a lens mounting surface 130 and a pair of apertures 131 for attachment with the lens unit 102. In this regard, the lens unit 102 may be placed adjacent to the lens mounting surface 130 such that the apertures of lens unit 102 align with corresponding apertures 131 of the lens mounting surface. Fixation elements 122 may then be secured through the corresponding apertures, allowing the lens unit 102 to be removably secured to the lens mounting surface 130. The lens mounting surface 130 may be curved to conform to the shape of a corresponding portion of the lens unit surface 106. The curvature of the lens mounting surface 130 may be any type of curvature depending on the shape of the lens unit 102. In this example, the lens mounting surface may be convexly curved.

The various components of retention structure 120 can be made of similar or different materials. As discussed above, housing member 132 can be formed from various plastic or polymeric materials, such as Nylon, ABS plastic, polycarbonate, polyethylene, polystyrene or the like. As further discussed above, any or all of the alignment flanges 140, bosses 126, or a wall extending between flanges 140 can be integrally formed with housing member of a similar material. In other examples housing member can be made from metal and any other integrally-formed features can also be made of the same piece of metal such as by machining, die-casting, metal injection molding, 3-D printing or the like. Plungers 136 can be made from a polymeric material such as Nylon, Teflon, or the various plastics listed above in connection with housing member 132. Alternatively, plungers 136 can be made from a metal or the like.

Figure 3:
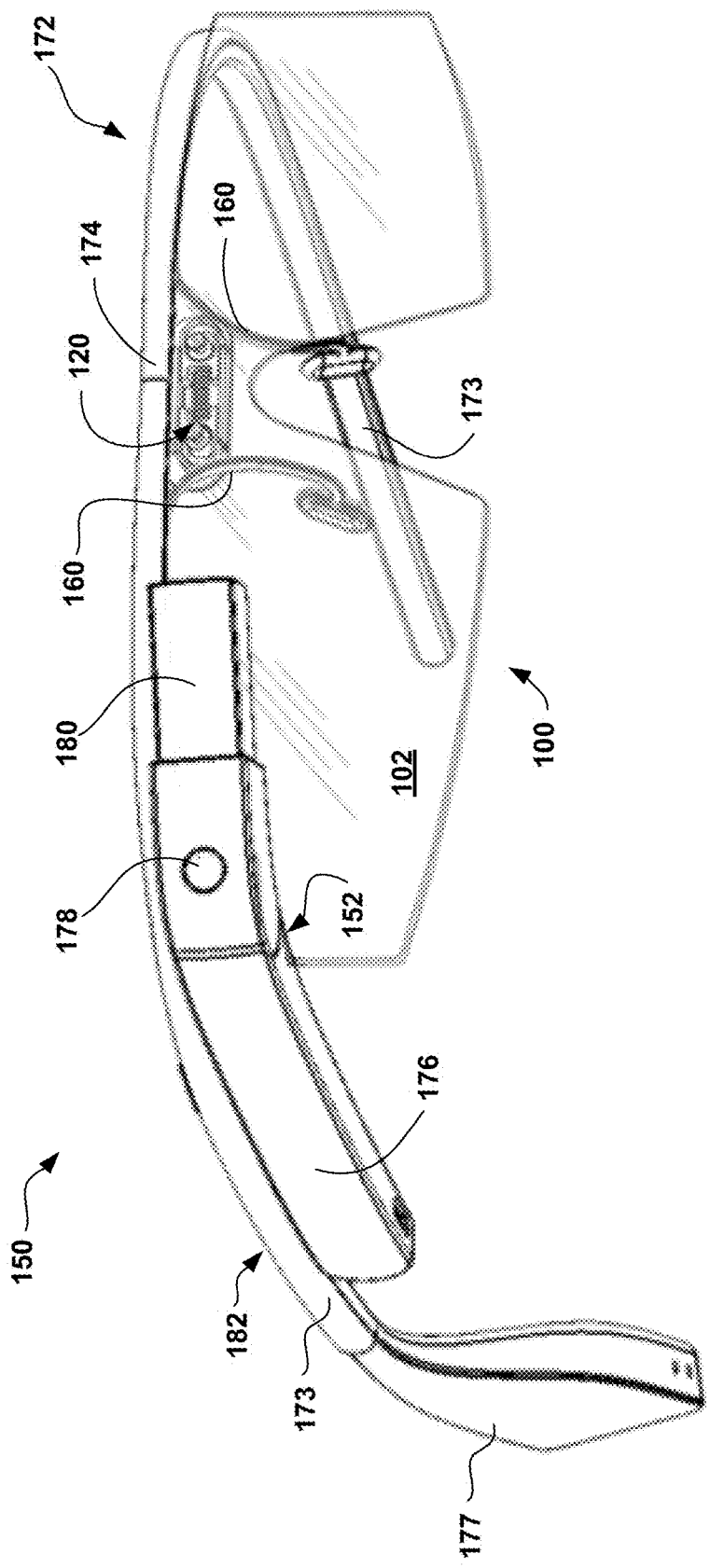
FIG. 3 illustrates the lens system of FIG. 1 in an assembly with a wearable computing device.
Figure 4:
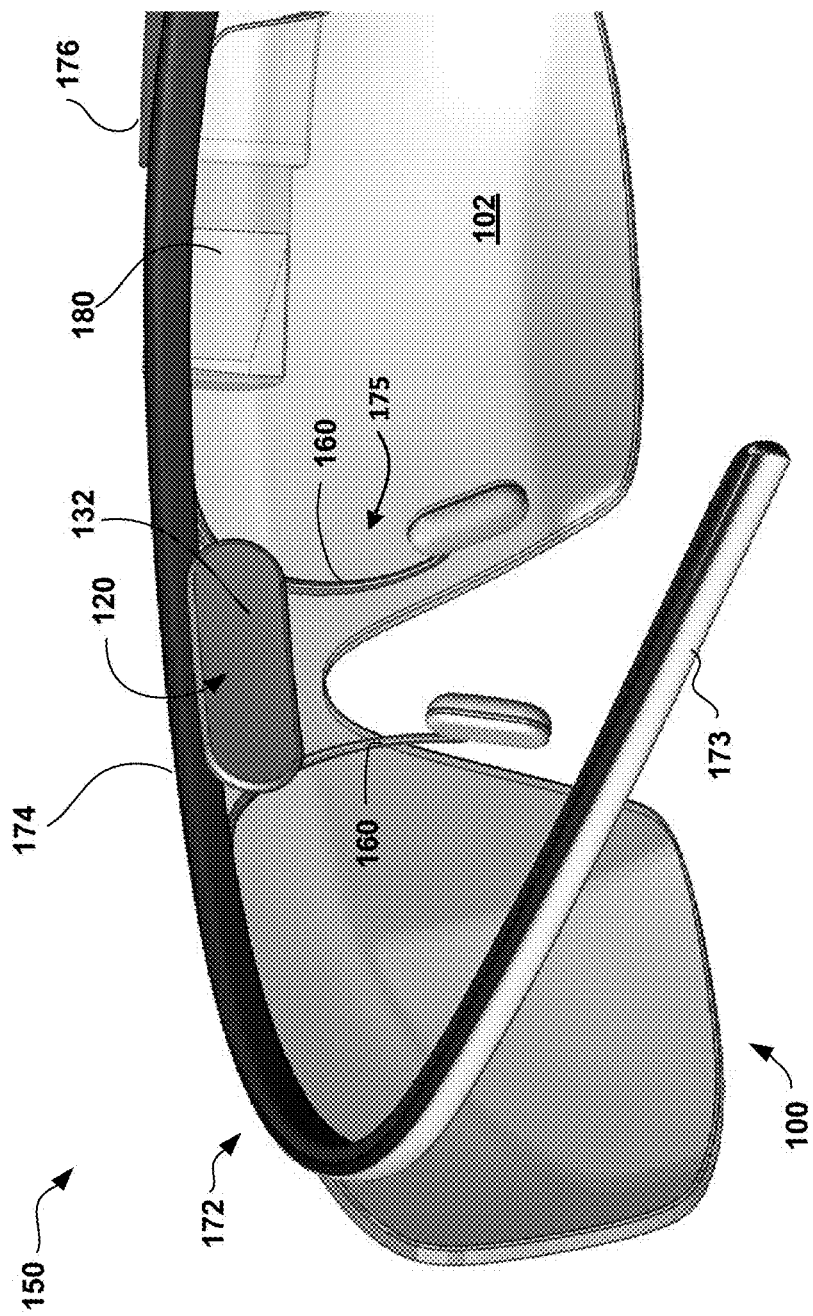
FIG. 4 is an alternate view of the assembly of FIG. 3.

FIGS. 3 and 4 illustrate an assembly 150 of a head-mounted device ("HMD") 172 with the lens system 100 according to one aspect of the disclosure. HMD 172 is a wearable computing device configured to be wearable on the head of the user. As shown, the HMD 172 may include a band 182 that defines side-arms 173, a center frame support 174, and a nosepiece 175 (FIG. 4). In the example shown in FIG. 3, the center frame support 174 connects between the side-arms 173. The HMD 172 does not include its own lenses and, thus, can be worn and used with or without lens unit 102 by assembly or disassembly with lens unit 100, as will be described below. In other examples, HMD 172 can includes lenses in a structure similar to that shown in co-pending, commonly assigned U.S. patent application Ser. No. 13/435,944, the entire disclosure of which is incorporated by reference herein. Such lenses can be, for example, corrective lenses that can be transparent and the lens unit 102 of lens system 100 can be tinted or can otherwise include sun protection such that lens unit 102 can be attached with HMD 172 to provide a system 150 with corrective lenses and selective sun protection.

The HMD 172 may include a component housing 176, which may include an on-board computing system (not shown), an image capture device 178, and a button 179 (FIG. 5) for operating the image capture device 178 (and/or usable for other purposes). Component housing 176 may also include other electrical components and/or may be electrically connected to electrical components at other locations within or on the HMD.

Additionally, component housing 176 can include additional input structures, such as a button 167 (shown in FIG. 6) that can provide additional functionality for HMD 172, including implementing a lock or sleep feature or allowing a user to toggle the power for HMD 172 between on and off states. The button 167 can further include an LED light beneath a surface thereof that can indicate a status of the device, such as on or off, or asleep or awake. The button can be configured such that the light is visible when on, but that the source of the light cannot be seen when the light is off.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

Figure 5:
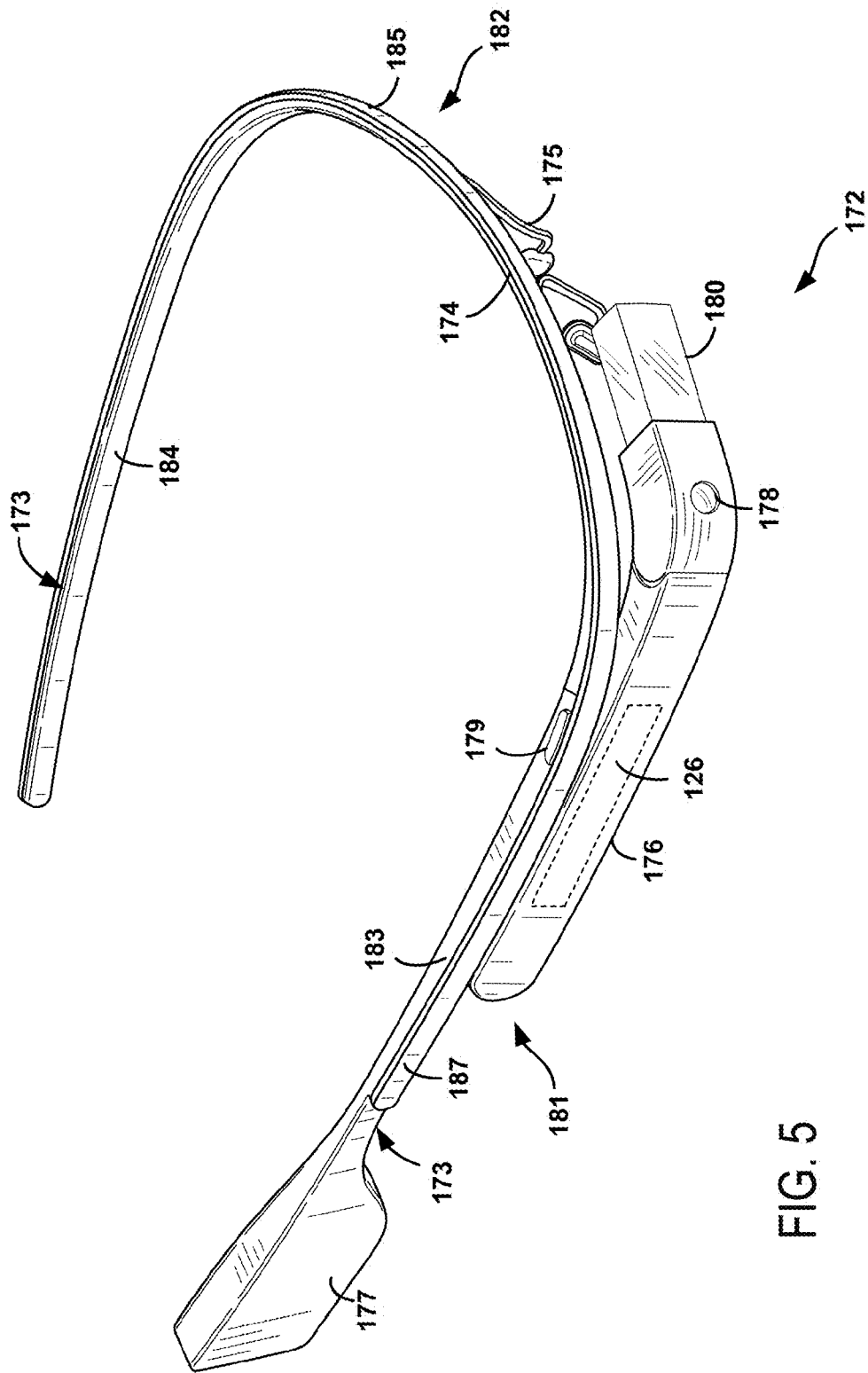
FIG. 5 illustrates the wearable computing device of FIGS. 3 and 4 without the lens system assembled therewith.
Figure 6:
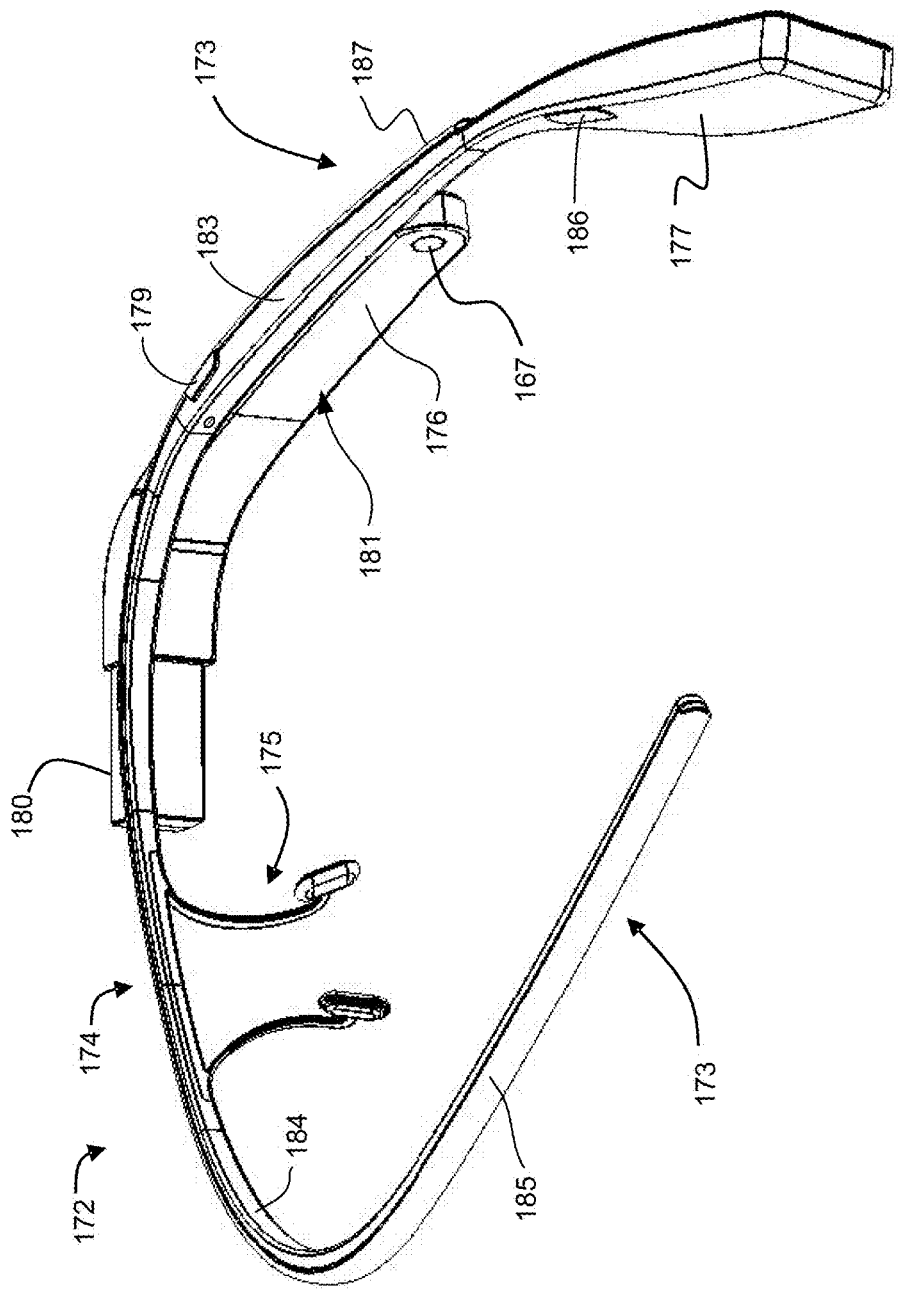
FIG. 6 is an alternate view of the wearable computing device illustrated in FIG. 5.

As shown in FIGS. 5 and 6, an end of one of the side arms 173 can be enlarged in the form of an auxiliary housing 177 that can house circuitry and/or a power supply (e.g., removable or rechargeable battery) for HMD 172. In an example, auxiliary housing 177 can be configured and positioned to provide a balancing weight to that of component housing 176. The components within auxiliary housing 177, such as a battery or various control circuitry can be arranged to contribute to a desired weight distribution for HMD 172. HMD may 172 also include a bone-conducting transducer ("BCT") 186 (FIG. 6) positioned on an inner surface of auxiliary housing 177 such that BCT 186 contacts the head of a wearer of HMD 172 to transmit sound through the user's skull to the inner structure of the user's ear.

It is also noted that, although the embodiment of FIGS. 3 and 4 shows a component housing 176 that is positioned on side arm 173 such that it is positioned over the right eye of a user when being worn, other similar embodiments are possible in which a mirror-image of component housing 176 can be attached on an opposite side arm 173 to make it positionable over the left eye of the user. Depending on the application of HMD 172 or individual user preferences, it may be desirable to position component housing 176 on a particular side of the user's head. For example, a right-handed person may prefer having the component housing 176 on the right side of her head to make interaction with touch-based input 126 easier. In another example, a person may prefer to have the display 180 over a dominant eye for easier interaction with elements presented on display 180 or over a non-dominant eye to make it easier to shift his focus away from elements presented on display 180 when engaged in other activities.

Figure 7:
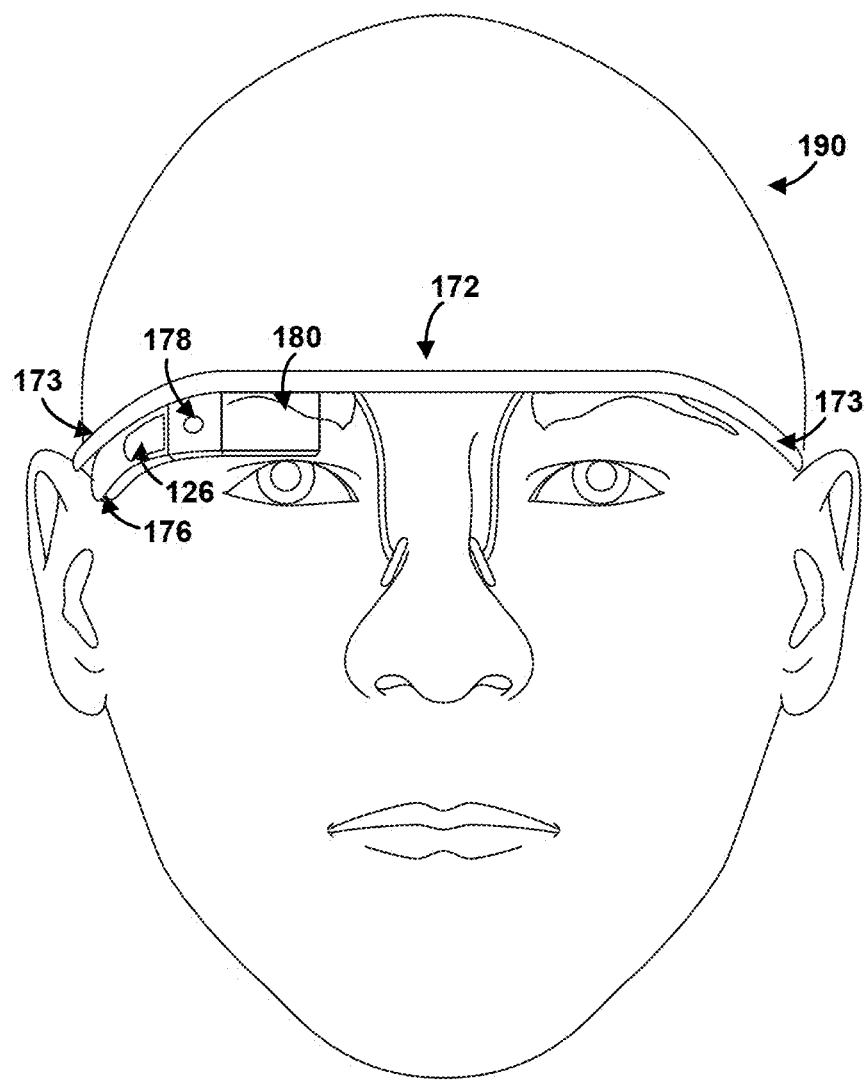
FIGS. 7-9 show a front elevation view and side elevation views of the device of FIG. 5 being worn by a user.
Figure 8:
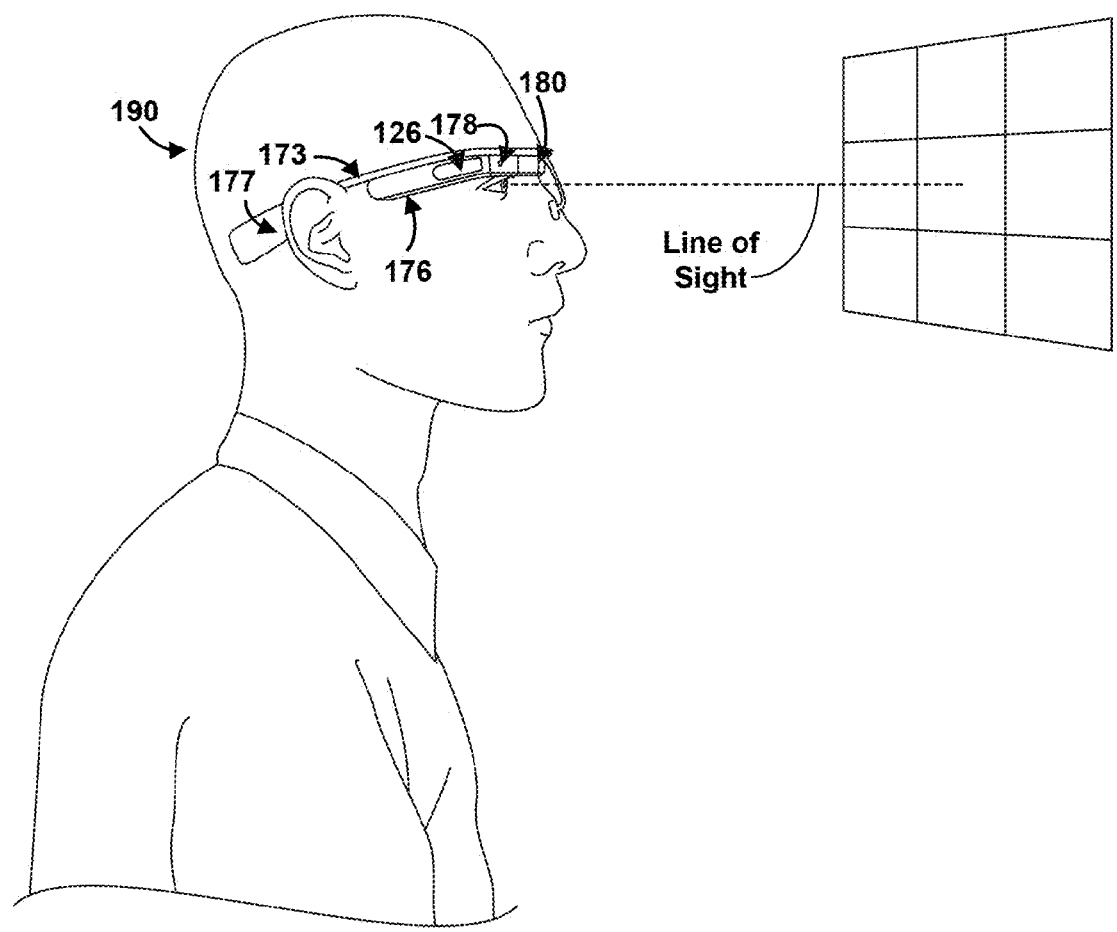
Figure 9:
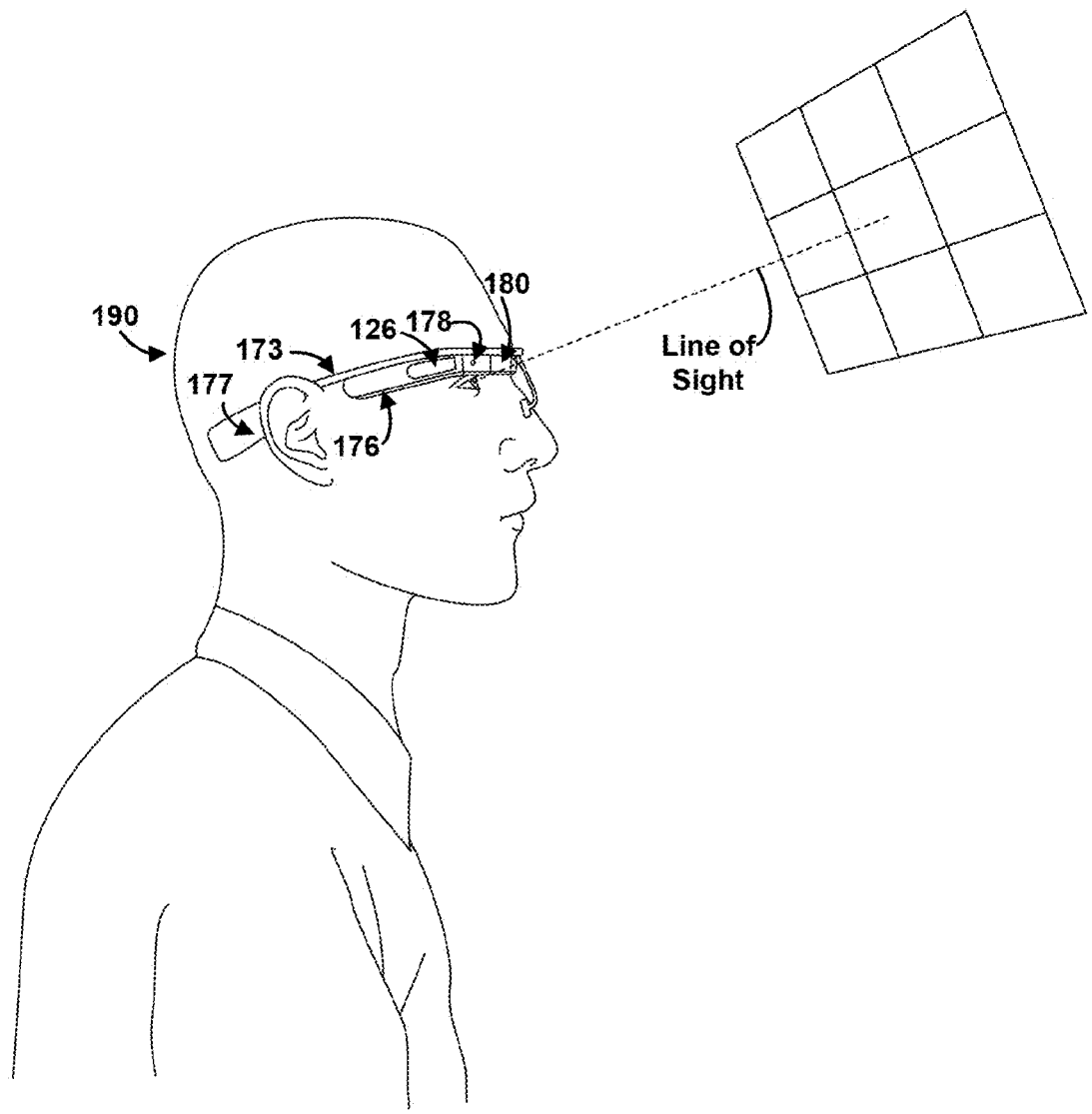

FIGS. 7-9 are simplified illustrations of the HMD 172 shown in FIGS. 2 and 3, being worn by a wearer 190 without lens unit 100 assembled therewith. As shown in FIG. 7, when HMD 172 is worn, BCT 186 is arranged it is located behind the wearer's ear. As such, BCT 186 is not visible from the perspective shown in any of FIGS. 7-9.

In the illustrated example, the display 180 may be arranged such that when HMD 172 is worn, display 180 is positioned in front of or proximate to a user's eye. For example, display 180 may be positioned below the center frame support and above the center of the wearer's eye, as shown in FIG. 7. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 7-9, display 180 may be located in the periphery of the field of view of the wearer 190, when HMD 172 is worn. Thus, as shown by FIG. 8, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others and can also generally provide unobstructed viewing and perception of the world within the central portion of the wearer's field of view. Further, when the display 180 is located as shown, the wearer 190 may view the display 180 by, e.g., looking up with their eyes only. This is illustrated as shown in FIG. 9, where the wearer has moved their eyes to look up and align their line of sight with display 180. A wearer might also use the display by tilting their head down and aligning their eye with the display 180. Lens unit 100 is configured to attach with HMD 172, as will be describe in detail below, such that the fit of HMD 172 on the user's head, and the corresponding positioning of display 180 remains generally the same with lens unit 100 assembled therewith.

Side arms 173 can be configured to contact the head of the user along respective temples or in the area of respective ears of the user. Further, band 182 can be configured to resiliently deform through a sufficient range and under an appropriate amount of force to provide a secure fit on user's heads of various sizes. To accomplish this band 182 can be structured to elastically deform (or resiliently deform) such that the distance between the ends of side arms 173 increases under force. In an example, band 182 can be configured such that it conforms to fit on a user's head by flexing laterally of center frame support 174, and further such that center frame support 174 does not substantially deform during such flexing. Accordingly, by structuring attachment member 120 to attach to HMD 173 along center frame support 174 and within nosepiece 175, as described further below, lens system 100 can be made resistant to becoming dislodged or detached from HMD 172 during flexing of band 182.

Band 182 can be configured to include a compliant inner portion 184 and a resilient outer portion 185, as shown in FIGS. 5 and 6. Inner portion 184 can include any portions of the band 182 that are intended to contact the user's head. In the particular embodiment shown, inner portion 184 can define the entire inner surface of band 182 to ensure that the compliant material of inner portion makes contact with the user's head regardless of the area of band 182 along which contact is made with the user's head. Inner portion 184 can be made of any material that can provide a degree of compliance to enhance the comfort of the fit of band 182 on the user's head while being able to retain its general shape. Acceptable materials include various foams, such as foam rubber, neoprene, natural or synthetic leather, and various fabrics. In an embodiment, inner portion 184 is made of various types of Nylon, including for example, a polyamide nylon such as Grilamid TR90.

Outer portion 185 of band 182 can be made of a resiliently flexible material such as metal or plastic. In general, the nature of such a material should be such that outer portion 185 can maintain the desired shape for band 182 while allowing flexibility so that band 182 can expand to fit on a user's head while applying a comfortable pressure thereto to help retain band 182 on the user's head. Outer portion 185 can be elastically deformable up to a sufficiently high threshold that the shape of band 182 will not be permanently deformed simply by being worn by a user with a large head. Acceptable materials for outer portion 185 include metals such as aluminum, nickel, titanium (including grade 5 titanium), various steels (including spring steel, stainless steel or the like), or alloys including these and other metals.

As discussed above, center frame support 174 includes nosepiece 175 configured to rest on the nose of a wearer with the center frame support 174 providing a central support for side arms 173, which can extend unitarily therefrom, or can at least appear to extend unitarily therefrom, with an area of transition between the center frame support 174 and the side arms 173 including a bend or curve therebetween. In this example, the nosepiece 175 is disposed on the lens unit surface 106 side of the lens unit 102 when lens system 100 is assembled with HMD 172, as shown in FIG. 3. Nosepiece 175 can include a pair of bridge arms 160 that extend from the center frame support 174. In the view of the embodiment of device assembly 150 shown in FIG. 3, bridge arms 160 extend in a downward direction from center frame support 174. The orientation of device assembly 150 shown in FIG. 3 generally corresponds to the orientation of HMD 172 when being worn by a user when the user's head is in a neutral, upright position. The description of bridge arms 160 extending downward from center frame support 174 is made in such a reference frame and is done for purposes of the present description. Discussion of any other relative reference directions is also made for similar purposes and none are intended to be limiting with respect to the present disclosure, unless explicitly stated.

Bridge arms 160 can include respective pads 162 thereon, which can be positioned to rest on parts of the nose of the wearer. Pads 162 can be made of a material that is softer than bridge arms 160 for purposes of comfort. Additionally, the material that pads 162 are made from can be flexible or have a texture that prevents slippage along the surface of the user's nose. Bridge arms 160 can be flexible to further provide a comfortable fit and or grip on the user's nose. Further, bridge arms 160 can be bendable and repositionable so that the position of pads 162 can be changed to best fit the user. This can include movement closer together or farther apart or fore and aft relative to center frame support 174, which can adjust the height of center frame support 174 and, accordingly, the position of extension arm 314 and its display 354 relative to the user's eye. In other embodiments, structures similar to arms and pads can be integrally formed with center frame support 174 and can be structured such that larger or smaller areas of the nosepiece 175 contact the nose of the user, compared to the embodiment shown.

The arrangement and configuration of nosepiece 175 is such that HMD 172 can be worn on a user's head with nosepiece 175 resting on the user's nose with side arms 173 extending over respective temples of the user and over adjacent ears. The HMD 172 can be configured, such as by adjustment of bridge arms 160 or display 180 to ensure the display 180 is appropriately positioned in view of one of the user's eyes. As discussed above, in one position, HMD 172 can be positioned on the user's head, with bridge arms 160 being adjusted to position display 180 in a location within the user's field of view, but such that the user must direct her eyes upward to fully view the image on the display.

Figure 11C:
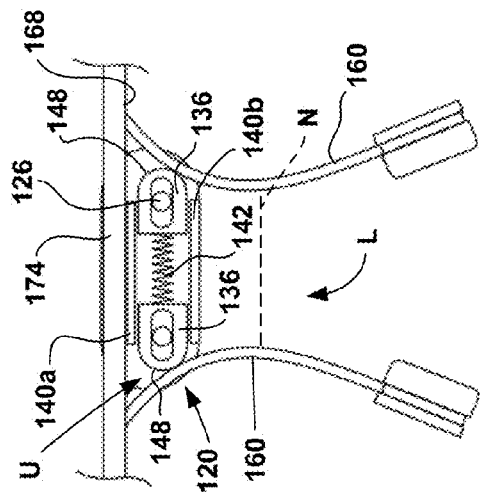
FIG. 11C illustrates the components of the lens system of FIGS. 11A and 11B in an assembled stated.

As shown in FIGS. 3 and 11C, lens system 100 can attach with HMD 172 by engagement of retention structure 120 with portions of nosepiece 175 and center frame support 174. In particular, plungers 136 can contact respective ones of bridge arms 160. The structural relationship between bridge arms 160 and plungers 136 can be such that plungers are inwardly-displaced compared to the neutral position thereof described above with respect to FIG. 1. That is, plungers can be forced inward such that bosses 126 are positioned away from inside ends 144 of the respective slots 138 and such that spring 142 is further compressed. The pressure thusly maintained between plungers 136 and bridge arms 160 can help secure the attachment between retention structure 120 and nosepiece 175 and can help to center lens system 100 with respect to band 182. As further illustrated, the uppermost alignment flange 140 can contact a surface 168 of center frame support 174. This contact can further help maintain the attachment and positioning of lens system 100 with HMD 172.

In the example of HMD 172 illustrated, bridge arms 160 are configured, as shown to have arcuate shapes so as to angle inwardly as they initially extend away from their spaced-apart points of attachment with center frame support 174. This angle may vary with the distance from center frame support 174 due to the curvature or radius of bridge arms 160, as shown. The bridge arms 160 can also converge to define a location, aligned with respective apexes of the arcs of the bridge arms 160, where bridge arms 160 reach their closest distance together so as to define a neck portion N, before diverging again to the location of pads 162. As such, the neck portion N can divide upper U and lower L portions of the nosepiece 175. The lens system 100 of the present example can take advantage of such a configuration of nosepiece 175. In particular, the plungers 136 can be configured to contact bridge arms 160 within the upper portion U thereof such that the pressure between plungers 136 and bridge arms 160 includes a component along path P and also in a direction perpendicular to P that urges retention structure 120 in an direction away from neck portion N. This arrangement can create a mutual force or pressure between center frame support 174 and alignment flange 140*a* to maintain mutual engagement therebetween.

Additionally, housing member 132 can be positioned, as described above, with respect to lens unit surface 106 such that the volume defined between surface 106 and housing surface 134 can receive arms 160 therein. As shown, this arrangement is such that portions of arms 160 are positioned between lens unit 102 and housing member 132. This maintains the fore and aft positioning of lens system 100 with respect to HMD 172 such that plungers 136 remain engaged with arms 160. A portion of center frame support 174 can also be received between lens unit surface 106 and housing surface 134 to further facilitate such attachment.

As shown in FIG. 3, certain types of lens units 102 can be configured to extend laterally outward of component housing 176 of HMD 172. Such lens units 102 can include a corresponding cutout 152 (FIG. 1) that is configured to allow component housing 176 to pass therethrough to appropriately position display 180 within the user's line of sight without interference with lens system 100.

Figure 10:
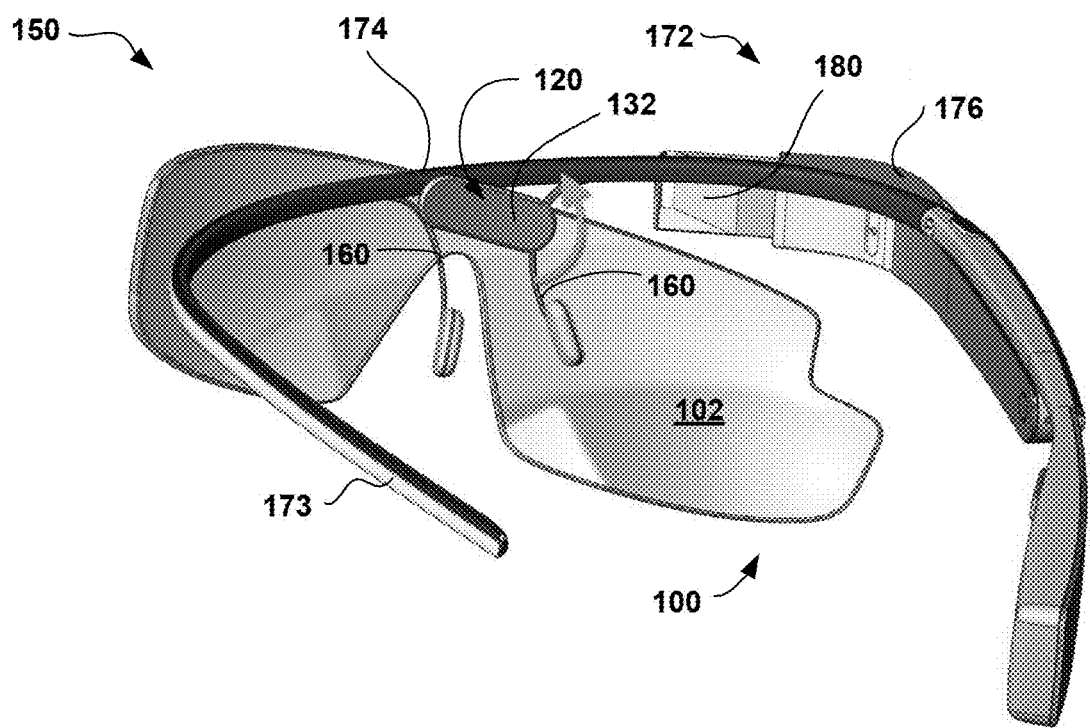
FIG. 10 illustrates the lens system of FIG. 1 in a step during a process of assembly thereof with the device of FIG. 5.
Figure 11B:
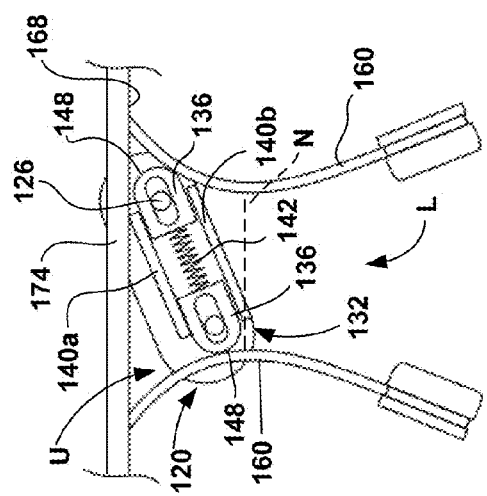
FIGS. 11A and 11B illustrate components of the lens system and the device in various steps during a process of assembly.
Figure 11A:
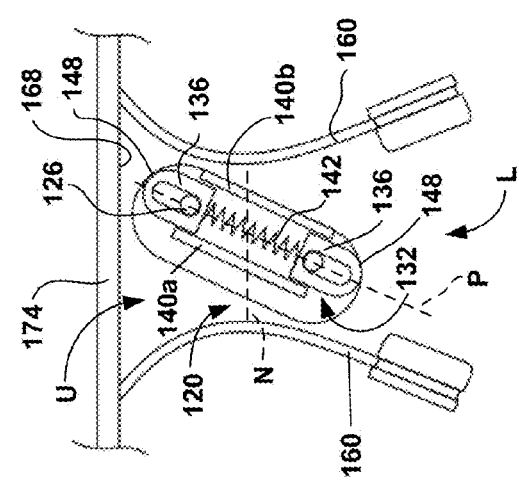

FIGS. 10 and 11A-11C illustrate an example way of assembling of the removable lenses 100 with a HMD 172 according to one aspect of the disclosure. As shown in FIGS. 10 and 11A, the lens system 100 may be advanced toward the HMD 172. In particular, the lens system 100 may be advanced toward the HMD 172 at a predetermined rotational angle with respect HMD 172 and the assembled position of the lens system 100 with HMD 172. For example, the angle may range from 0 to 90 degrees, depending on the configurations of retention structure 120 and nosepiece 175, and in particular may be from 45 degrees to 90 degrees. When within the predetermined angle range, retention structure can be moved into a position to engage with nosepiece 175 and center frame support 174, as described above. In this angled/rotated position, retention structure 120 can be moved into a position between bridge arms 160 without substantial interference therebetween. As shown in FIG. 11A, this can allow one of the plungers 136 to be positioned in contact with a respective one of arms 160 within the upper portion U of nosepiece 175 with the other plunger 136 within the lower portion L of nosepiece 175. At the same time the arm 160 adjacent that plunger 136 is positioned between lens unit 102 and housing member 132.

Lens system 100 can then be rotated toward the neutral, engaged position shown above, brining outer surface 148 of the plunger 136 within lower portion L into contact with its respective arm 160. As rotation of lens system 100 is continued, as shown in FIG. 11B, the rotational force is translated by the arcuate shape of bridge arm 160 into a compressive force against plunger 136 and into spring 142 such that spring 142 is compressed and one or both plungers 136 move closer together within retention structure 120. This allows plunger the plunger 136 that was initially positioned in lower portion L to move through neck portion N and into upper portion U, where spring 142 can extend toward its natural position, thereby forcing plungers 136 outwardly and snapping retention structure 120 and, accordingly, lens system 100 into the position shown in FIGS. 3 and 11C. It is noted that the symmetric nature of retention structure 120 and of nosepiece 175 is such that lens system 100 can be attached with HMD 172 by starting with the opposite initial position shown in FIG. 11A and by rotating lens system in the opposite direction.

Lens system 100 can be removed from HMD 172 by rotation of lens system 100 relative to HMD 172 in either direction such that one of the plungers 136 moves along arm 160 toward neck portion N. This causes compression of spring 142 and relative inward movement of plungers 136, thereby allowing one of the plungers to move past neck portion N and into lower portion L. This results in lens system 100 being positioned relative to HMD 172 as shown in FIG. 11A, allowing retention structure 120 to be disengaged with nosepiece and lens system 100 to be removed completely from HMD.

Figure 13:
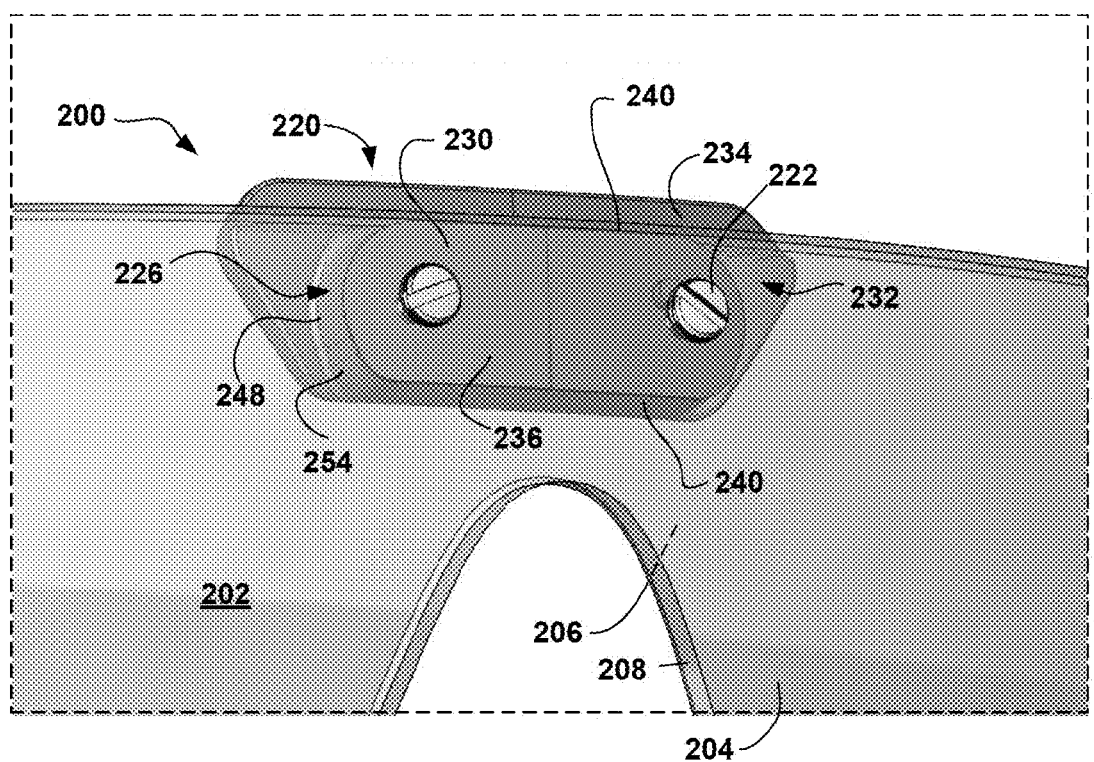
FIG. 13 illustrates a detail view of a portion of a lens system according to another aspect of the disclosure.

Another example of a lens system 200 is shown in FIG. 13, and includes a lens unit 202 that can be similar to the lens unit 102 discussed above with respect to FIG. 1. A retention structure 220 is affixed to lens unit 202 using fixation elements 222, such as in the example of FIG. 1, using fixation element 122. Retention structure 220 can include a housing member 232 having a housing surface 234 that is spaced apart from lens surface 206 at a distance adequate to allow a feature from an external structure to which lens system 200, such as arms 160, to be received therein. A body 226 extends away from housing surface 234 and defines a lens mounting surface 230 thereon with lens mounting surface 230 being configured to contact surface 206 of lens unit 202 during attachment of retention structure 220 to lens unit 202. As such, the distance by which body 226 extends from housing member 232 can define the distance between lens surface 206 and housing surface 234.

Body 226 can be configured with an upper surface 240a and a lower surface 240b that are spaced apart from and generally parallel to one another. Laterally opposed outside surfaces 234 extend between upper surface 240a and lower surface 240b on opposite sides of body 226 and can be configured to be received between opposed features of an external structure to which lens system 200 is attachable. In an example, outside surfaces 234 are shaped to partially correspond to the shape of arms 160 of the nosepiece 175 of HMD 172, as shown in FIGS. 5 and 6. Accordingly, surfaces 234 can be shaped to include concave portions 254. This shape can particularly correspond to the shape of upper portion U of nosepiece 175, as discussed above, as defined by portions of arms 160 that converge toward neck portion N.

Portions of body 226 can be somewhat oversized compared to the natural size of upper portion U of nosepiece 175 when lens system 200 is not attached therewith. Such a configuration can cause arms 160 to flex outwardly somewhat from their natural position when retention structure 220 is positioned therein. This arrangement can create pressure between arms 160 and surfaces 248, similar to the pressure created by the spring-biasing of plungers 136 discussed in another example above. The pressure created by the flexation of arms 160 can also cause upper surface 140a to be forced into contact with surface 168 of center frame support 174 in a similar manner to which flange 140a is forced into contact therewith in a previously-discussed example.

Lens system 200 can be assembled with a HMD 172 in a manner similar to that discussed above with respect to lens system 100. That is, lens system 200 can be aligned with HMD 172 in an angled or rotated position such that retention structure 220 can fit through neck portion N of nosepiece 175 without substantial interference with arms 160. This allows a leading one of the surfaces 248 to be brought into contact with a corresponding arm 160 within upper portion U or nosepiece in an arrangement similar to that of retention structure 120 as shown in FIG. 10. Lens system 200 can then be rotated such that the surface 248 within lower portion L of nosepiece 175 is brought into contact with its corresponding arm. Continued rotation of lens system 200 can then cause one or both arms 160 to flex outwardly to allow neck portion N to increase in width and to allow body 126 to pass therethrough. At such a point, one or both of the arms 160 can relax and partially return to a neutral position, thereby securing body 226 within upper portion U of nosepiece 175. In such a position, arms 160 and optionally band 182 can be positioned between lens surface 206 and housing surface 234 to help maintain body 226 in position within the upper portion U of nosepiece 175.

Either of the lens systems 100 or 200 discussed above can be used with other types of head-wearable structures that include appropriately configured nosepieces with features that at least approximate the above-discussed configurations of arms 160, and surface 168. Such structures can include various forms of eyeglasses, such as non-tinted corrective lenses, over which a wearer may desire to assemble tinted or protective lenses. Further, such structures can be similar to band 182 without component housing 176 or auxiliary housing 177 such that various, customizable forms of eyewear can be derived by selectively attaching different lens systems therewith. Additionally, lens systems 100 or 200 can be configured according to the principles discussed above to assemble with other types or configurations of head mounted displays that may differ in configuration from that which is discussed above.

When assembled with HMD, the lens system 100 or 200 may be disposed between the eye of a user and the display 180 of HMD 172 when worn by the user. In this regard, the lens system 100 or 200 may serve as an eye protection from foreign objects, such as footballs, soccer balls, debris, or any other object. Additionally, the lens system 100 or 200 may serve to protect the user's eye from the display object in the event of mechanical failure, such as detachment of the display 180 or breaking or shattering of the display 180.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A device mountable lens component, comprising:
  a lens unit defining a first surface and having a first lens; and
  a retention structure, including:
    a housing member defining a second surface, the housing member being attached with the lens unit such that the second surface faces the first surface and is spaced apart therefrom at a first distance so as to define an area therebetween, the housing member including a pair of spaced-apart bosses extending away from the second surface;
    first and second plungers movably affixed within the area between the lens unit and the housing member, the first and second plungers being biased away from each other in opposite directions along a path and moveable toward and away from each other along the path, the plungers each including respective slots therethrough that extend along the direction of the path and are configured to receive a respective one of the bosses therethrough, wherein when the plungers are biased away from each other, each of the respective bosses are positioned adjacent respective ends of the respective slots, and when the plungers are moved toward one another, the bosses are positioned away from the respective ends of the respective slots.

2. The lens component of claim 1, wherein the housing member includes a flange projecting away from the second surface and toward the first surface, the flange extending along the second surface in a direction generally parallel with the path such that the plungers are configured to contact the flange through any movement thereof along the path.

3. The lens component of claim 1, wherein the plungers each include first and second faces on opposite sides thereof, wherein the first and second faces respectively contact the first surface of the lens unit and the second surface of the housing member.

4. The lens component of claim 3, wherein the first surface of the lens unit and the second surface of the housing member define a curvature in at least one direction, and wherein the first and second faces of the plungers define curvatures to respectively match those of the first and second surfaces.

5. The lens component of claim 1, wherein the path is curved along a plane generally perpendicular to the housing member.

6. The lens component of claim 1, wherein the plungers are biased away from each other by a first spring positioned therebetween.

7. The lens component of claim 6, wherein the housing member includes a flange extending away from the second surface thereof toward the first surface of the lens unit, the plungers being positioned on opposite sides of the flange, and wherein the plungers are biased away from each other by the first spring positioned between a first one of the plungers and the flange and a second spring positioned between a second one of the plungers and the flange.

8. The lens component of claim 1, wherein the plungers each include an outside end, each of the outside ends including a curved face.

9. The lens component of claim 8, wherein the curved faces are semi-circular.

10. The lens component of claim 1, wherein the plungers are integral with a biasing element extending therebetween.

11. The lens component of claim 1, wherein the first lens of the lens unit is configured to be simultaneously positionable over both eyes of a wearer and defines a central attachment area to which the retention structure is attached, the first surface extending at least within the attachment area.

12. The lens component of claim 1, wherein the lens unit further includes a second lens and a bridge member attached between the first lens and the second lens, the retention structure being attached to the bridge member and the first surface being defined on the bridge member.

13. The lens component of claim 1, wherein the first and second plungers are integral portions of a biasing member affixed within the area between the first lens unit and the housing member, the biasing member including a spring portion between the plungers that biases the plungers away from each other.

14. The retention structure of claim 1, wherein fixation elements extend through the bosses and removably couple the retention structure to the lens unit.

15. A head-wearable device system, comprising:
a head retention structure including a center frame support, a first side arm extending from the center frame support on a first side thereof, and a second side arm extending from the center frame support on a second side thereof, the head retention structure further including a nosepiece defined by a pair of nosepiece arms extending from a surface of the center frame support between the first and second sides; and
a lens unit defining a lens unit surface and including a lens and first, second, and third attachment surfaces extending away from the lens unit surface, the first and second attachment surfaces facing away from each other, and the third attachment surface extending between the first and second attachment surfaces;
wherein the lens unit is removably attachable with the head retention structure by engagement of the first and second attachment surfaces with respective ones of the nosepiece arms and by engagement of the third attachment surface with the surface of the center frame support, the engagement of the first and second attachment surfaces with the respective nosepiece arms creating an engagement force therebetween with a first directional component parallel to the center frame support and with a second directional component that maintains the third attachment surface in engagement with the surface of the center frame support, and
wherein the lens unit further includes first and second plungers movably affixed with the lens unit, the first and second plungers being biased away from each other in opposite directions along a path and moveable toward and away from each other along the path, the first and second attachment surfaces being defined on respective ones of the first and second plungers, the first and second plungers being configured to exert the engagement force against the nosepiece arms.

16. The system of claim 15, wherein the lens unit further includes a flange projecting away from the lens unit surface, the flange extending along the lens unit surface in a direction generally parallel with the path such that the plungers contact the flange through any movement thereof along the path, the third attachment surface being defined on the path.

17. The system of claim 15, wherein the nose bridge arms are spaced apart from each other at respective attachment points with the center frame support and are shaped to extend toward each other within an upper portion of the nosepiece, and wherein the lens unit is removably attachable with the head retention structure by engagement of the plungers with respective nosepiece arms within the upper portion of the nosepiece.

18. The system of claim 17, wherein when the nosepiece is attached with the head retention structure, the outward force of the plungers against the nosepiece arms within the upper portion causes a component force to be applied by the plungers against the center frame support.

19. The system of claim 15, wherein the lens unit is removable from the head retention structure by a force applied to the lens with at least a component in a direction perpendicular with the center frame support, and wherein such force causes inward movement of at least one plunger against the outward force.

20. The system of claim 19, wherein the force applied to the lens causes a twisting movement of the lens unit and causes rotational movement of one of the plungers away from the center frame support.

21. The system of claim 19, wherein during the twisting movement of the lens, another one of the plungers remains in contact with both the center frame support and the respective one of the nosepiece arms.

22. The system of claim 19, wherein the nosepiece arms are curved in shape so as to extend toward each other within an upper portion of the nosepiece and away from each other within a lower portion of the nosepiece with apexes of the nosepieces separating the upper and lower portions, and wherein the inward movement of at least one of the plungers against the outward force occurs when the plunger is in the upper portion.

23. The system of claim 22, wherein the at least one of the plungers moves outward when the plunger is in the lower portion.

24. The system of claim 15, wherein the plungers are spring biased away from each other so as to exert the outward forces against the nosepiece arms.

25. The system of claim 15, wherein the first, second, and third attachment surfaces are defined on a unitary body that extends away from the lens and is attached thereto.

26. The system of claim 15, wherein the lens unit further includes a housing member defining a housing surface, the housing member being attached with the lens such that the second surface faces the first surface and is spaced apart therefrom at a first distance so as to define an area therebetween, the first, second, and third attachment surfaces being disposed within the area between the lens unit surface and the housing surface.

27. The system of claim 15, wherein the head retention structure further includes a display attached to the first side arm, and wherein the lens unit is configured such that the lens is positionable between an eye of a user and the display when the head retention structure is worn by a user.

28. The system of claim 27, wherein the display is affixed to the first side arm by a component housing extending from the first side arm, and wherein the lens further includes a cutout portion configured to at least partially surround the component housing when the lens unit is attached to the head retention structure.

29. A retention structure useable with a lens unit for attachment thereof to a head wearable unit, the retention structure comprising:
 a housing member defining a surface and including a pair of spaced-apart bosses extending away from the surface and configured for attachment with the lens such that the surface is spaced apart from the lens;
 first and second plungers including respective slots therethrough within which respective ones of the bosses are received, the plungers being movable with respect to the housing member and toward and away from each other along a path having a component in a direction of the slots;
 fixation elements extending through the bosses; and
 biasing means configured to bias the first and second plungers away from each other in opposite directions along the path.

30. The retention structure of claim 29, wherein when the plungers are biased away from each other, each of the respective bosses are positioned adjacent respective ends of the respective slots, and when the plungers are moved toward one another, the bosses are positioned away from the respective ends of the respective slots.

* * * * *